United States Patent Office 3,219,122
Patented Nov. 23, 1965

3,219,122
VARIABLE PITCH FANS
George Alan Montgomerie, Leamington, and Robert Harwood, Solihull, England, assignors to Serck Radiators Limited, Birmingham, England
Filed Aug. 4, 1964, Ser. No. 387,388
Claims priority, application Great Britain, Jan. 20, 1964, 2,347/64
3 Claims. (Cl. 170—160.51)

This invention relates to variable pitch fans and has as an object the provision of such fans in a convenient form.

A fan in accordance with the invention comprises a hub assembly and a plurality of blades mounted on said assembly for angular movement relative thereto about radial axes, said hub assembly including means interconnecting said blades so that the latter are movable in unison and resilient means urging said blades towards maximum pitch positions, and the arrangement being such that when the fan is rotated, the blades are urged towards minimum pitch positions.

The invention will now be more particularly described with reference to the accompanying drawings wherein.

Figure 1:
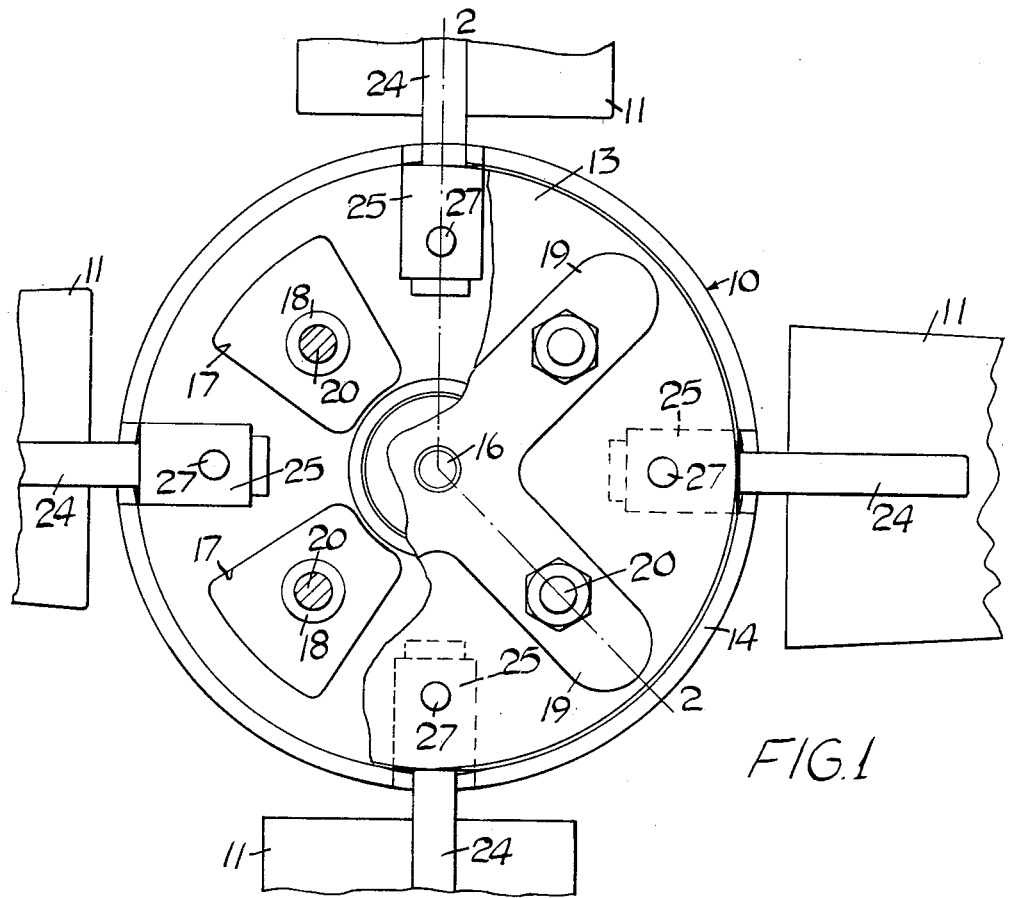
FIGURE 1 is a rear view of one example of a fan according to the invention shown with parts broken away for clarity.
Figure 5:
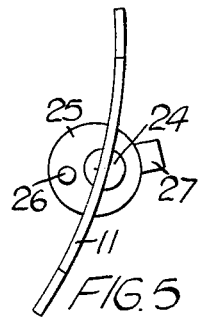
FIGURES 3, 4 and 5 are end views of one blade of the fan shown in three different operating positions.
Figure 4:
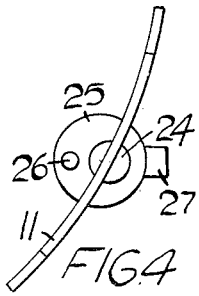

Referring firstly to the example shown in FIGURES 1 to 5 the fan includes a hub assembly 10 and a plurality of blades 11. The hub assembly is formed from first and second metal disc-like parts 12 and 13 respectively. The first part 12 has an axially projecting peripheral flange 14 which surrounds the periphery of the second part 13 and gives the hub assembly a neat enclosed appearance. The first part 12 is also embossed at its centre to provide a boss portion 15 by means of which the two hub parts are concentrically pivoted together. A pivot pin 16 forms the connection.

The first part 12 is formed with apertures 17 through which sleeves 18, welded to radial arms 19 on the second part 13, project. These sleeves 18 serve to limit relative angular movement between the two hub parts and also serve to house bolts 20 whereby the hub assembly can be connected to a flange 21 on a driving shaft 22.

A helically wound torsion spring 23 surrounds the boss portion 15 and is connected at its ends to the two hub portions 12, 13. This spring is arranged to urge the part 12 in a clockwise direction (as seen in FIGURE 1) relative to the part 13. Moreover the spring 23 is preloaded so that the sleeves 18 are pressed against the appropriate sides of the apertures 17.

Each of the blades 11 is connected by a rod 24 to a root piece 25. These root pieces are disposed between the two hub parts in recesses 12a in the first hub part 12 and each is pivoted on a radial axis to the first hub part 12. The pivotal connection is formed by a pin 26 extending intermediate the rod 24 and the base of the recess 12a in the first hub part 12. Each root piece 25 also has a projecting peg 27 which extends through a hole in the second hub part 13.

Figure 3:
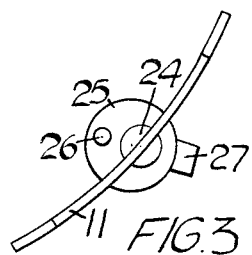
Figure 2:
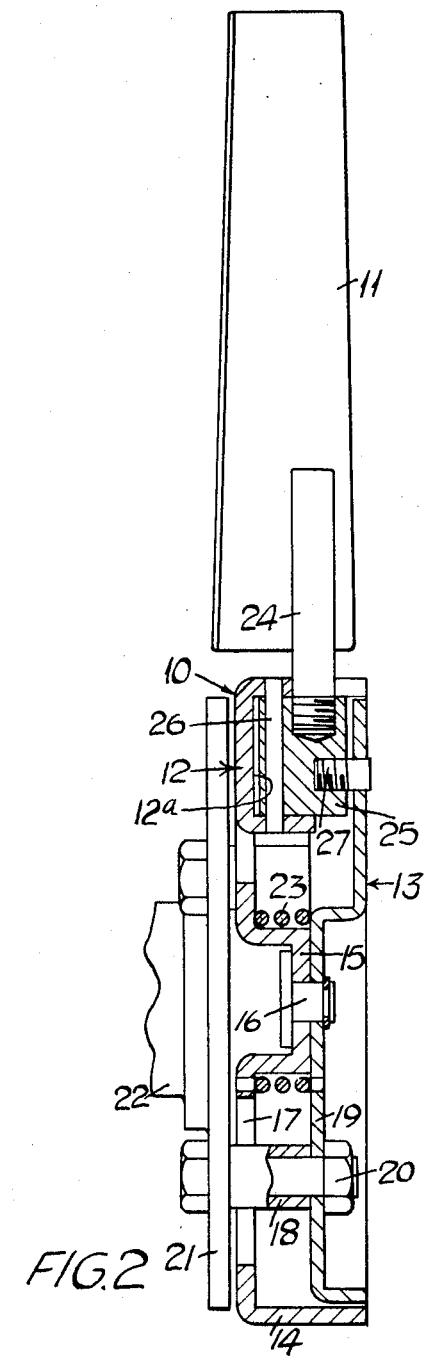
FIGURE 2 is a section on line 2—2 in FIGURE 1.

In use when the fan is at rest the blades 11 occupy the position shown in FIGURE 3 (in which the fan axis runs horizontally across the sheet). The sleeves 18 are now loaded against against the rear edges of the apertures 17 and the blades occupy maximum pitch positions. As the speed of rotation of the fan increases the reaction of the air on the blades causes an increasing torque to be applied to the hub assembly. Since the second hub part 13 is secured to the driving shaft and cannot yield, the first part 12 is urged relative to the second part 13 in a backward direction with respect to the direction of rotation of the fan (which would be clockwise in FIGURE 1) when the torque urging the part 12 in an anti-clockwise direction exceeds the torque exerted thereon in a clockwise direction by spring 23, the part 12 will be displaced carrying pins 26 with it. Since pegs 27 are engaged with part 13 the root pieces 25 will be turned in unison on their radial axes and pitch angles of the blades will be decreased. The blades 11 will thus pass through the midposition, shown in FIGURES 1, 2 and 4 and will finally reach the minimum pitch position shown in FIGURE 5.

The primary intended use of the fan described above is in the cooling system of a vehicle internal combustion engine. When the engine is running slowly the vehicle will normally be at rest so that it is required for the fan to deliver a considerable amount of air. The blades then occupy their high pitch positions. When the engine speed is high the vehicle will normally be moving forwards so that air can enter the cooling system without the assistance of the fan. The blades are moved by the increased torque to their minimum pitch positions.

In this way the fan does work only when required and consequently the power wasted on cooling the engine is reduced considerably.

Having thus described our invention what we claim as new and desire to secure by Letters Patent is:

1. A variable pitch fan comprising in combination first and second hub parts connected together for co-axial rotary movement relative to one another, means on the second hub part for mounting it on a shaft, means limiting relative rotary movement between said hub parts, resilient means acting between said hub parts for rotating the first hub part to a limiting position relative to the second hub part, a plurality of fan blades, a plurality of root pieces on said blades respectively disposed in recesses in the first hub part, a plurality of radial pivot pins extending respectively through said root pieces and pivotally connecting the root pieces to the first hub part, each blade having a connecting part attaching it to the associated root part, which connecting part is offset from the associated pivot pin, and means on said root parts engaging the second hub part and causing the blades to be turned from maximum pitch positions to minimum pitch positions as the torque applied to the first hub member as a result of rotation of the second hub member increases to overcome the influence of said resilient means.

2. A variable pitch fan comprising in combination first and second hub parts connected together for co-axial rotary movement relative to one another, means on the second hub part for mounting it on a shaft, means limiting relative rotary movement between said hub parts, resilient means acting between said hub parts for urging the first hub part to a limiting position relative to the second hub part, a plurality of fan blades, a plurality of root pieces on said blades respectively, disposed in recesses in the first hub part, a plurality of radial pivot pins extending respectively through said root pieces and pivotally connecting the root pieces to the first hub part, each blade having a connecting part attaching it to the associated root part, which connecting part is offset from the associated pivot pin, and projections on said root parts extending through holes in said second hub part and engageable by said second hub part to cause the blades to be turned from maximum pitch positions to minimum pitch positions as the torque applied to the first hub member, as a result of rotation of the second hub member, increases to overcome the influence of said resilient means.

3. A variable pitch fan comprising in combination a first hub part having thereon a boss part, a second hub part connected to said boss part for co-axial rotary movement relative thereto, means on said second hub part for mounting it on a shaft, means limiting relative rotary movement between said hub parts, a helical torsion spring extending around said boss part and having its ends connected respectively to the first and second hub parts and urging the first hub part to a limiting position relative to the second hub part, a plurality of fan blades, a plurality of root pieces on said blades respectively disposed in recesses in the first hub part, a plurality of radial pivot pins extending respectively through said root pieces and pivotally connecting the root pieces to the first hub part, each blade having a connecting part attaching it to the associated root part, which connecting part is offset from the associated pivot pin, and projections on said root parts extending through holes in the second hub part and engageable thereby to cause the blades to be turned from maximum pitch positions to minimum pitch positions as the torque applied to the first hub member as a result of rotation of the second hub member, increases to overcome the influence of said resilient means.

References Cited by the Examiner
UNITED STATES PATENTS

| | | | |
|---|---|---|---|
| 1,509,286 | 9/1924 | Colby. | |
| 1,757,292 | 5/1930 | Caldwell | 170—160.51 |
| 1,767,027 | 6/1930 | Waterman | 170—160.51 |
| 1,970,114 | 8/1934 | Wiegand | 170—160.51 |
| 2,471,578 | 5/1949 | Moore | 170—160.6 X |
| 3,099,321 | 7/1963 | Watts | 170—160.53 X |
| 3,105,558 | 10/1963 | Kell | 170—160.51 |
| 3,154,150 | 10/1964 | Dhonau | 170—160.51 X |

SAMUEL LEVINE, *Primary Examiner.*

JULIUS E. WEST, *Examiner.*